A. H. CARYL.
Hay Spreader.

No. 80,806.

Patented Aug. 11, 1868.

Witnesses.
Henry F. French.
H. L. Cheney.

Inventor
A. H. Caryl

United States Patent Office.

ALEXANDER H. CARYL, OF GROTON, MASSACHUSETTS.

Letters Patent No. 80,806, dated August 11, 1868.

IMPROVEMENT IN HAY-SPREADERS.

*The Schedule referred to in these Letters Patent and making part of the same.*

Be it known that I, ALEXANDER H. CARYL, of Groton, in the county of Middlesex, and Commonwealth of Massachusetts, have invented a new and useful Improvement in Hay-Spreaders; and I do hereby declare that the following is a full, clear, and exact description of the construction and operation of the same, reference being had to the annexed drawings, making a part of this specification, in which—

Figure 2:
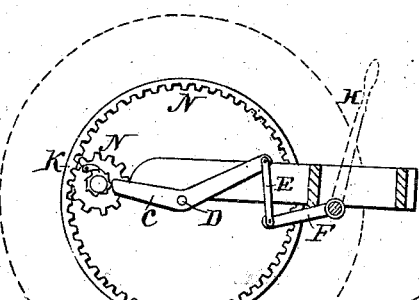
Figure 2 shows the arrangement of the lever with the propelling-gear and other parts.
Figure 1:
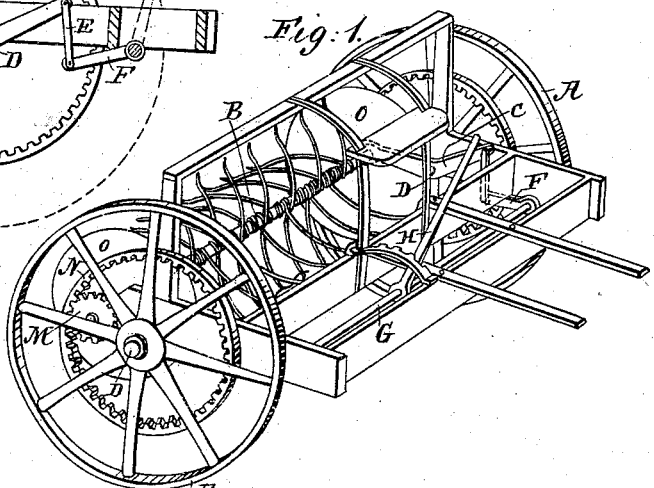
Figure 1 is a perspective view.
Figure 3:
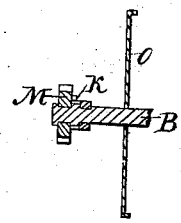
Figure 3 shows the end of the spreader-shaft and pinion, and one of the disks.
Figure 4:
Figure 4 shows the form of the teeth.

To enable others skilled in the art to make and use my invention, I will proceed to describe its construction and operation.

I adopt the common form of ground or carrying-wheels A A, having gearing by which motion of proper rapidity is transmitted to a spreader-shaft, B, to which are attached spiral or other teeth, by means of which the hay is turned and spread.

To carry the spreader-shaft B with the teeth backward out of the way of the wheels, and to raise and lower them at pleasure, and that the spreader-shaft may always be at the same distance from the centre of the ground-wheels, and so insure the proper working of the gear of the ground-wheels, I hang the spreader-shaft B on one end of the levers C C, which levers have their fulcra on the inner end of the short axles D D of the ground-wheels. To the other end of the levers C C, I attach, by means of a link, E, the cranks F F, which are connected together by the crank-shaft G, which is controlled by the hand-lever H, and held in the desired position by the ratchet J, or its equivalent.

That the machine, when in use, may be readily turned, one wheel running backward while the other runs forward, or is stationary, I make the pinion M loose upon the spreader-shaft B, and attach a pawl, K, and ratchet, L, to the inside of each of the pinions M, by means of which the spreader is turned when either of the ground-wheels moves forward, and released when both turn backward, and either wheel is left free to turn backward without turning the spreader.

To prevent the hay winding up in or obstructing the machine, I affix, to the shaft B, smooth disks O O, of wood or metal, outside the teeth, one disk at each end of the spreader-shaft, fixed and revolving with it.

That the spreader-teeth may catch the hay readily, I make the teeth of wire coiled around the shaft to form a spring, with their points turned outward so as to catch the hay and not to slip over it; and that the hay may readily slip from them and be turned as they move upward, I give them the reverse curve, as shown in the drawing.

What I claim as my invention, and desire to secure by Letters Patent, is—

The combination of the rock-shaft G, provided with arms F, hand-lever H, links E, levers C, and spreader-shaft B, arranged and operating substantially as and for the purposes set forth.

A. H. CARYL.

Witnesses:
HENRY S. FRENCH,
H. R. CHENEY.